United States Patent
Hars

(12) United States Patent (10) Patent No.: US 6,993,543 B2
Hars (45) Date of Patent: Jan. 31, 2006

(54) GAP HISTOGRAM ON-LINE RANDOMNESS TEST

(75) Inventor: Laszlo Hars, Cortlandt Manor, NY (US)

(73) Assignee: Koninklijke Philips Electronics N.V., Eindhoven (NL)

(*) Notice: Subject to any disclaimer, the term of this patent is extended or adjusted under 35 U.S.C. 154(b) by 664 days.

(21) Appl. No.: 10/127,556

(22) Filed: Apr. 22, 2002

(65) Prior Publication Data

US 2003/0200239 A1 Oct. 23, 2003

(51) Int. Cl.
G06F 1/02 (2006.01)

(52) U.S. Cl. ..................... 708/250; 702/179
(58) Field of Classification Search ........ 708/250–256; 702/719

See application file for complete search history.

(56) References Cited

U.S. PATENT DOCUMENTS

| | | | | |
|---|---|---|---|---|
| 5,675,649 A | * | 10/1997 | Brennan et al. | 708/250 |
| 5,781,458 A | * | 7/1998 | Gilley | 708/255 |
| 6,215,874 B1 | * | 4/2001 | Borza et al. | 708/250 |
| 6,675,113 B2 | * | 1/2004 | Hars | 702/75 |

OTHER PUBLICATIONS

"Efficient Online Test for True Random Number Generators" by Werner Schindler, 2001 Proceedings, Lecture Notes in Computer Science, vol. 2162, May 14, 2001, pp. 103-117—XP001061161.

"The Art of Computer Programming, Empirical Tests", Art of Computer Programming, pp. 61-75—XP002248905.

* cited by examiner

Primary Examiner—Tan V. Mai
(74) Attorney, Agent, or Firm—Adam L. Stroud

(57) ABSTRACT

A method and apparatus for testing random numbers generated by a random-number generator in real time. A stream of random bits generated by the random-number generator is segmented into a predefined block of bits, then these blocks undergo a gap-length-calculation operation in which it is determined for which specific range the gap belongs to, then these gap length values are applied to an exponential-counting operation to obtain and update gap-frequency values for different bit patterns and gap ranges. Thereafter, the updated gap-frequency values are compared to at least one predetermined acceptance range, so that if at least one of the gap-frequency values falls repeatedly outside the predetermined acceptance range more than a predetermined number of times, it is determined that the generated random bits are insufficiently random.

19 Claims, 2 Drawing Sheets

GAP HISTOGRAM ON-LINE RANDOMNESS TEST

BACKGROUND OF THE INVENTION

1. Field of the Invention

The present invention pertains to the field of random-number generators and, in particular, for testing whether the random numbers generated by a random-number generator are sufficiently random.

2. Description of the Related Art

A truly random sequence is difficult to generate in real application. For example, heat is typically generated in the hardware component of a random-number generator when the random-number generator generates a series of 1's and 0's over a time period. In some situations generating a 1 bit could consume more power than generating a 0 bit. When a long sequence of 1 bits is generated, the electrical circuit of the random generator tends to become hot. Thus, if the circuit generates a 1 bit when it is hot, the circuit will "latch up." As a result, the circuit will generate mostly 1 bits but rarely a 0 bit. The fore-mentioned biased 0/1 frequency error will have catastrophic consequences if the random numbers are used in security critical applications.

Accordingly, both the detection of hardware tampering and a component failure are necessary when conducting randomness tests. Conventional randomness tests are performed through extensive statistical testing, such as chi-squared tests, delta tests, and the like, on a sequence of generated random numbers. However, such tests are very expensive to perform in real time as they require a great amount of computational-processing power.

SUMMARY OF THE INVENTION

The present invention overcomes the above-described problems, and provides additional advantages by providing a method and apparatus for providing an on-line randomness test to ensure that the generated random numbers are sufficiently random.

According to one aspect of the invention, a method for testing randomness of a stream of random numbers includes the steps of generating a continuous stream of random binary bits; segmenting the random binary bits into a predefined block of bits; applying each the predefined block of bits to an exponential-gap-frequency calculation (A) to compute and update a gap-frequency value between at least two identical block of bits; and, determining whether the generated random bits are sufficiently random by comparing the output of the exponential-gap-frequency calculation to a predetermined acceptance range. The method further includes the steps of: determining that the generated random bits are insufficiently random when at least one of the gap-frequency values falls repeatedly outside the predetermined acceptance range more than a predefined number of times; notifying that the generated random bits are insufficiently random when at least one of the gap-frequency values falls repeatedly outside the predetermined acceptance range more than a predefined number of times; and, generating a new set of random bits when at least one of the gap-frequency values falls repeatedly outside the predetermined acceptance range more than a predefined number of times.

According to another aspect of the invention, a method for testing a stream of random numbers generated by a random-number generator includes the steps of: segmenting the random binary bits into a predefined block of bits; applying the segmented random bits to a gap-length calculation; applying the output of the gap-length calculation to an exponential averaging counting to obtain and update a gap-frequency value between at least two identical blocks of bits; comparing the gap-frequency value to a predetermined acceptance range; and, determining that the generated random bits are insufficiently random when any of the gap-frequency values falls outside the predetermined acceptance range more than the predefined number of times.

According to a further aspect of the invention, a system for testing randomness includes a random-number generator for generating a random sequence comprising binary bits; a detector for detecting whether the generated random sequence is sufficiently random based on an exponential-gap-frequency operation; and, a switch for controlling the flow of the generated random sequences for a subsequent application based on the outcome of the exponential-gap-frequency operation, wherein the random sequence is segmented into a predefined block of bits to undergo the exponential-gap-frequency operation to obtain and update gap frequency values between at least two identical blocks of bits and wherein, if at least one of the gap-frequency values repeatedly falls outside a predetermined acceptance range more than a predefined number of times, determining that the generated random sequences are insufficiently random. The system further includes means for transmitting an alarm signal that the generated random sequences are insufficiently random when at least one of the gap-frequency values falls repeatedly outside the predetermined acceptance range more than the predefined number of times, and means for generating a new set of random bits when at least one of the gap-frequency values falls repeatedly outside the predetermined acceptance range more than the predefined number of times.

Yet another aspect is that the present invention may be implemented in hardware, software, or a combination of hardware and software as desired for a particular application.

Furthermore, the present invention may be realized in a simple, reliable, and inexpensive implementation.

These and other advantages will become apparent to those skilled in this art upon reading the following detailed description in conjunction with the accompanying drawings.

DETAILED DESCRIPTION OF THE EMBODIMENT

In the following description, for purposes of explanation rather than limitation, specific details are set forth such as the particular architecture, interfaces, techniques, etc., in order to provide a thorough understanding of the present invention. However, it will be apparent to those skilled in the art that the present invention may be practiced in other embodiments, which depart from these specific details. For purposes of simplicity and clarity, detailed descriptions of well-known devices, circuits, and methods are omitted so as not to obscure the description of the present invention with unnecessary detail.

Figure 1:
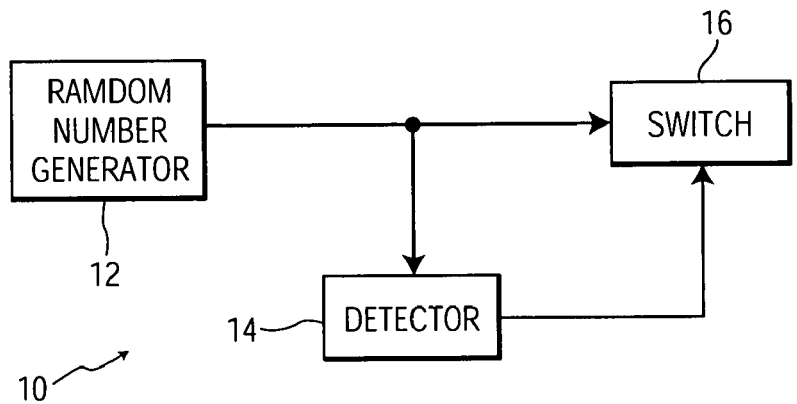
FIG. 1 illustrates a simplified block diagram of the random-number-generating module according to an embodiment of the present invention.

FIG. 1 illustrates a simplified block diagram of a random-number-generating system 10 according to an exemplary embodiment of the present invention. The system 10 includes a random-number generator (RG) 12 for generating a series of random numbers, a detector 14, and a switch 16. The RG 12 in this disclosure means any device that produces a signal that can be converted into a sequence of binary bits or any other form that includes the desired randomness in any conventional or unconventional manner. The detector 14 detects whether the generated random numbers are truly random sequences according to predetermined criteria (explained later). The switch 16 may represent an input to a cryptography system, an audio or video noise generator, a computer program, or other devices and processes.

In operation, as the random numbers are generated by the random-number generator 12, the detector 14 detects whether the generated random numbers form a truly random sequence. If they are determined to be sufficiently random within a specific acceptable range, the switch 16 allows the generated random numbers to be forwarded to any suitable subsequent applications, such as any circuit, system, process, gambling application, simulation, statistical sampling, the Diffie-Hellman key exchange, or the like which uses the random numbers supplied by the RG 12. Accordingly, the switch 16 may stop the flow of the generated random numbers when the generated random numbers are deemed insufficiently random by the detector 14. In an alternate embodiment, a new set of random numbers may be generated by the random-number generator 12 if the generated random sequence is determined to be insufficiently random.

Now, a description will be made in detail in regards to determining whether the generated random numbers are sufficiently random with reference to FIGS. 2 and 3.

Figure 2:
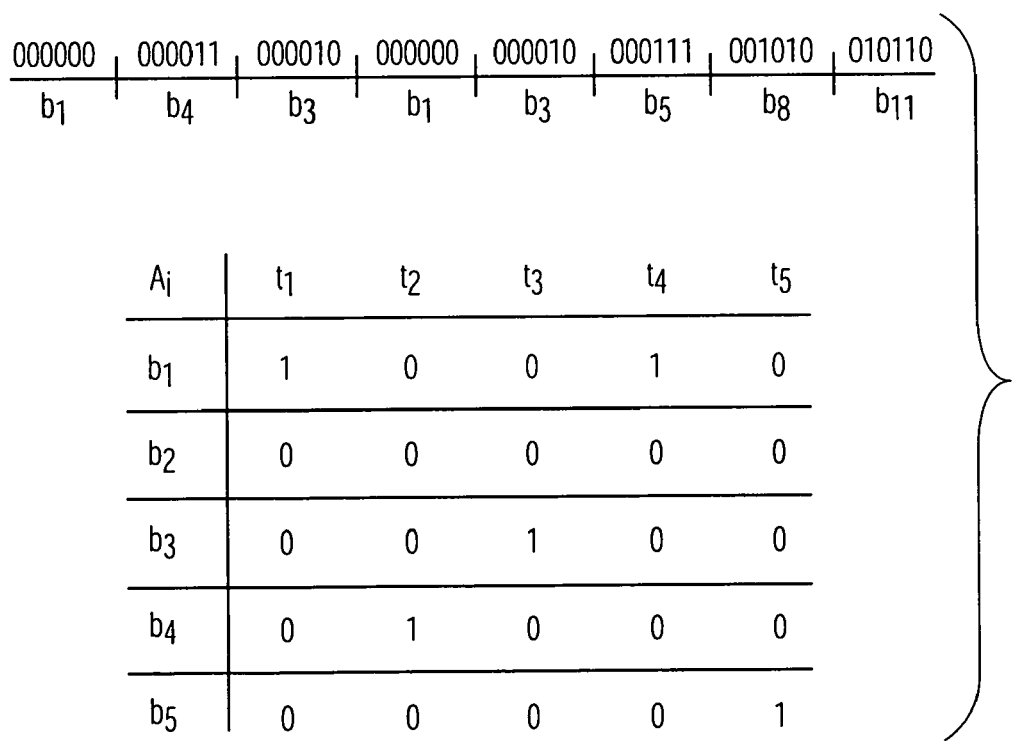
FIG. 2 shows a diagram showing the randomness test performed on a sequence of random numbers according to an embodiment of the present invention; and, FIG. 3 is a flow chart illustrating the operation steps of testing the statistics of the generated random numbers according to an embodiment of the present invention.

Referring to FIG. 2, as a stream of random numbers is generated by the RG 12 the generated random numbers are segmented into a predetermined block of k bits. Each time a new random bit is generated the new bit is appended to the sequence of previous bits until k bits are collected. Note that a group of 6 bits as a unit of k bits is described for illustrative purposes; however, it should be understood that the present invention can support any positive integer number of k bits. Thus, the grouping of 6 bits in the drawing should not impose limitations on the scope of the invention.

In the embodiment, each of the segmented blocks of k bits is analyzed by the detector 14 to determine the distance from the previous occurrence of the same k-bit block, called the gap, for all segmented blocks. A key principle of the present invention is that the average number of times a certain gap length between identical k-bit patterns appears is known. If the range of all possible gap lengths is partitioned into appropriate intervals, the number of times the calculated gap lengths fall in each interval must be approximately the same. An accumulator (A) is provided for each possible block of k bits and each gap length interval, such that each time a new k-bit block is generated and the gap is calculated from the previous occurrence of the same k bit block, the binary representation of the k-bits in the block and the interval number where this gap falls in are used to index the respective accumulator. For example, as shown in FIG. 2, the gap corresponding to the pattern "000000" is 3 as the pattern occurs in the first block and forth block. The gap corresponding to the pattern "000010" is 2 as the pattern occurs in the third and fifth blocks. The accumulators keep track of the average number of times (frequency) a certain gap for a specific block of bits falls into a predetermined interval of gap lengths, then it is determined whether the generated random numbers will be sufficiently random by analyzing the number of times a gap falls in a predetermined range for each block, which must be roughly the same for all possible k-bit blocks and gap range.

Note that as the present invention is applicable in real time to test the random sequence, all accumulators must be updated. As such, the old frequency values should have a diminishing or no effect. That is, the test to evaluate the statistical quality of the random sequence runs continuously, thus the accumulators must be cleared periodically to avoid overflow. There are various counting methods that can be implemented in accordance with the techniques of the present invention; however, exponential averaging is preferably used during the frequency counting operation, as described below.

If an accumulator A is used to obtain an average number of occurrences or frequency of a certain gap range, each time k random bits are generated, a factor, $\alpha$, which falls between 0 and 1 ($0<\alpha<1$), is multiplied to the accumulator ($A_{old}$) and then an indicator value b is added: $A_{new}=\alpha \cdot A_{old}+b$. Here b is 1 if the k-bit block and the range, where the gap belongs to, corresponds to the accumulator used, otherwise b=0. Note that the exponential-average accumulators, A, are first initialized for each possible $b_n$ pattern ($0 \leq n < 2^k$) and for each possible interval of of the possible gap range. The initialization values are initialized with pre-assigned values by the operator. To have useful averaging effects, the value for $\alpha$ is selected to be close to 1, $\alpha=1-1/n$, $n>>1$. In this case, $\log \alpha \approx -1/n$ and the half-life of the averaged values, where their weights are reduce to half, is $k \approx n \cdot \log 2 \approx 0.30103 \cdot n$. After n steps, the weight of the oldest averaged value becomes $(1-1/n)^n \approx 1/e \approx 0.367879$. Here, e is the basis of the natural logarithm (the Euler constant), so the term, n, becomes the natural life of an averaged value. If all averaged values were 1's, the accumulator contains $1+\alpha+\alpha^2+\ldots =1/\alpha(1-\alpha)=n$, whereas if all averaged values were 0's the accumulator value is 0. Note that the expected value of the exponential average is the exponential average of the expected values of the individual values. If the averaged values were uniform distributed binary bits, the expected value of the exponential average is: $\frac{1}{2}+\frac{1}{2}\alpha+\frac{1}{2}\alpha^2+\ldots =n/2$.

As described above, the exponential averaging serves to clear the counter as the accumulator is decreased with a certain $0<\alpha<1$ factor; thus, the accumulator never becomes too large during the operation mode. Once the exponential averaging is performed for each accumulator, the value of each exponential averaging is compared to a predetermined acceptance range. If the value of any accumulator falls out of the predetermined range during the exponential-averaging counting, it is inferred that the generated random numbers would be insufficiently random according to the embodiment of the present invention. Here, a threshold value may be set to notify the user when the test fails repeatedly. The exact boundary of the acceptance can be selectively adjusted based on the data obtained from extensive simulations with a known, good source of random numbers, in which an ideal gap distribution can be obtained. Such random sequences are commercially available and can be downloaded, for example, from various web sources, including "www.fourmilab.ch/hotbits" and "lavarand.sgi-.com." Thus, the actual range used in the test is selectively set by an operator so that a choice can be made of different sensibilities as to whether the generated random sequence is deemed sufficiently random. In an alternate embodiment, a different acceptance range can be assigned to each accumulator.

Figure 3:
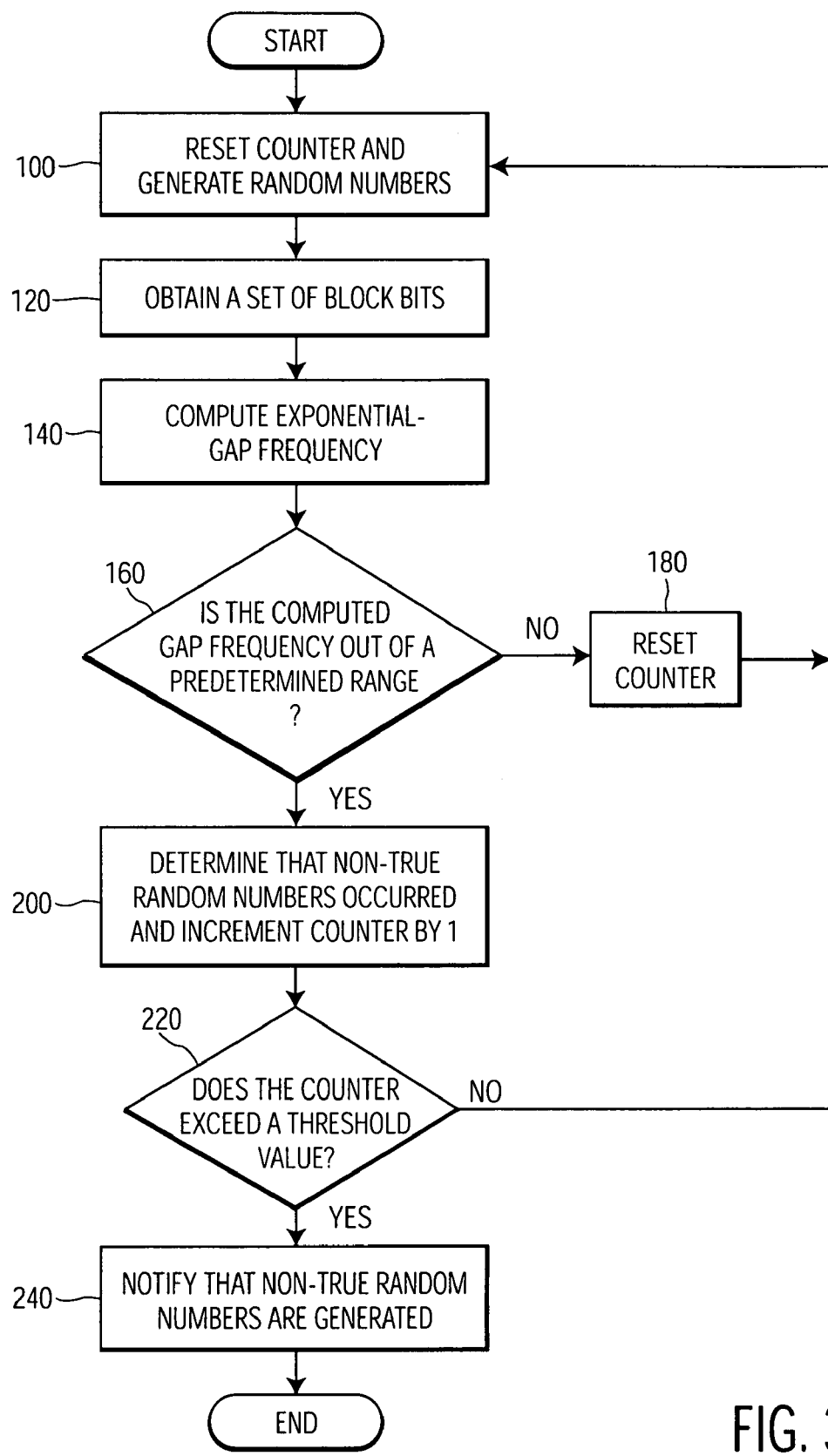

FIG. 3 is a flow chart illustrating the operation steps for testing the statistical quality of the random sequence in accordance with the present invention. The rectangular elements indicate computer-software instruction, whereas the diamond-shaped element represents computer-software instructions that affect the execution of the computer-software instructions represented by the rectangular blocks. Alternatively, the processing and decision blocks represent steps performed by functionally equivalent circuits such as a digital-signal-processor circuit or an application-specific-integrated circuit (ASIC). It should be noted that many routine program elements are not shown, such as initialization of loops and variables and the use of temporary variables. It will be appreciated by those of ordinary skill in the art that unless otherwise indicated herein, the particular sequence of steps described is illustrative only and can be varied without departing from the spirit of the invention.

As shown in FIG. 3, the randomness test is initiated upon generating a continuous stream of random binary bits by the random-number generator 12 in step 100. In step 120, the generated random numbers are segmented into a set of block bits. Then, the set of block bits undergoes a gap-frequency calculation, in which a gap distribution between identical bit patterns of a specified length is computed. Each time a gap between the same bit patterns is found, the set of exponential-gap-frequency values is updated in each accumulator in step 140. Here, all previous exponential-gap-frequency values are reduced by a factor $\alpha(0<\alpha<1)$, then 1 added to the accumulator corresponding to the k-bit block and the range where the gap falls into, such that the old gap frequency values will have a diminishing effect. After undergoing the exponential averaging operation the gap-frequency values are compared to a predetermined acceptance range or respective predetermined acceptance ranges in step 160. If any of the values in each accumulator A is outside the predetermined acceptance range, it is determined that non-random patterns have been detected in step 200, and the counter is increased by 1. Otherwise, the counter is reset in step 180 and returns to step 100 of processing random numbers. In step 220, if the value of the counter is greater than a threshold value, a notification is transmitted in step 240 that the generated random numbers are not sufficiently random. Alternatively, the switch 16 can be deactivated to stop the flow of the random numbers for a subsequent application. Then, the generated random numbers can be discarded, and the whole process of generating new random numbers can be initiated. If the value of the counter does not exceed the threshold value in step 220, the process of generating random numbers is repeated.

The various steps described above may be implemented by programming them into functions incorporated within application programs, and programmers of ordinary skill in the field can implement them using customary programming techniques in languages, such as C, Visual Basic, Java, Perl, C++, and the like. In an exemplary embodiment, the method described in FIG. 3 may be constructed as follows (using the C programming language). For simplicity we implemented the test using floating-point arithmetic.

---

Appendix: MS Visual C code

```
/*****************************************************************\
 * GapHist.c
 *      GapHist <#random words> <bit generator type> <bit generator param>
 *      Generates test bits
 *      Calculates Histograms of Gaps of 6 bit words (non-overlapping)
 *          Cyclic 16-bit counters determine the gaps between occurances of words
 *          Exponential averaging of the histogram values
 *      Prints test statistics
 *
 * ANOTHER TEST HAS TO VERIFY EQUAL WORD-FREQUENCIES
 *
 * GapHist 1e7 0 0.5
 * Min Max of exponential gap histograms of 6-bit words = 69.5647 142.51
 *
 * GapHist 1e6 0 0.49
 * Too large bias at word 739364 in 6-bit word gap histograms [64.9633 145.289]
 *
 * GapHist 1e6 2 6 0 1 63 [ all 6 bit words ]
 * Too large bias at word 3968 in 6-bit word gap histograms [94.8608 147.487]
 *
 * Vers. 1.0   04/22/01: Created by Laszlo Hars
 *
\*****************************************************************/
#include <stdio.h>
#include <stdlib.h>
// Multiplyer = 1-1/2^10
#define W           0.9990234375
#define w0          100.0
#define L0           65.0
#define HI          147.0
#define WDLEN        6
#define WDNUM       (1<<WDLEN)
#define HISTNUM     10
#define MAX(A,B)    ((A) > (B) ? (A) : (B))
#define MIN(A,B)    ((A) < (B) ? (A) : (B))
#define MASK16      ((1<<16)-1)
```

-continued

Appendix: MS Visual C code

```
typedef unsigned __int16 uint16;   // 16 bit counters with cyclic difference
// External function prototypes
void BitGenInit( int argc, char *argv[]);
unsigned int NextBit();
    if( argc < 4) {
        printf("Usage: GapHist <#random words> <bit generator type> <bit generator params . . . >\n");
        putchar('\a');                // rings the bell
        exit(1);     }
    BitGenInit(argc, argv);
    for(i = 0; i < WDNUM; ++i) {
        c[i] = 0;                     // Reset counters
        for(j = 0; j < HISTNUM; ++j)
            h[i][j] = w0;             // Initialize running average
    }
    for(i = 0; i < 9*WDNUM; ++i) {    // Initialize counters - can be left out
        wd = NextBit();
        for(K = 1; k < WDLEN; ++k)
            wd = (wd<<1) + NextBit();
        c[wd] = (i & MASK16);
    }
    for(i = 9*WDNUM; i < n; ++i) {
        wd = NextBit();
        for(k = 1; k < WDLEN; ++k)
            wd = (wd<<1) + NextBIt();
        d = (i & MASK16) - c[wd];
        c[wd] = (i & MASK16+1;        // circular correction
        if (d <= 0) d += MASK16+1;
        k = d<8?0: d<16?1: d<24?2: d<34?3: d<46?4: d<60?5: d<78?6: d<104?7: d<148?8:9;
        for(j = 0; j < HISTNUM; ++j) {
            h[wd][j] *= W;
            if( j != k) hmin = MIN(h[wd][j],hmin);
        }
        h[wd][k] += 1.0;              // Exponential frequency
        hmax = MAX(h[wd][k],hmax);
        if( hmin < LP || hmax > HI ) {
            printf("Too large bias at word %d in 6-bit word gap histograms [%g %g]\n", i, hmin, hmax);
            exit(2); }
    }
    printf("Min Max of exponential gap histograms of 6-bit words = %g %g\n", hmin, hmax);
}
```

While the preferred embodiments of the present invention have been illustrated and described, it will be understood by those skilled in the art that various changes and modifications may be made and equivalents substituted for elements thereof without departing from the true scope of the present invention. In addition, many modifications can be made to adapt to a particular situation and the teaching of the present invention without departing from the central scope. Therefore, it is intended that the present invention not be limited to the particular embodiment disclosed as the best mode contemplated for carrying out the present invention, but that the present invention include all embodiments falling within the scope of the appended claims.

What is claimed is:

1. A method for testing randomness of a stream of random numbers, the method comprising:
   generating a continuous stream of random binary bits;
   segmenting the random binary bits into a predefined block of bits;
   applying each the predefined block of bits to an exponential-gap-frequency calculation (A) to compute and update a gap-frequency value between at least two identical block of bits; and,
   determining whether the generated random bits are sufficiently random by comparing the output of the exponential-gap-frequency calculation to a predetermined acceptance range.

2. The method of claim 1, wherein
   the exponential-gap-frequency calculation (A) for each the predefined block of bits is updated according to the following equation:
   $A_{new} = \alpha \cdot A_{old} + b$, wherein $\alpha$ falls between 0 and 1 ($0 < \alpha < 1$), and wherein b=1 if the at least two identical block of bits occurs, otherwise b=0.

3. The method of claim 1, further comprising
   determining that the generated random bits are insufficiently random when at least one of the gap-frequency values falls repeatedly outside the predetermined acceptance range more than a predefined number of times.

4. The method of claim 1, further comprising
   notifying that the generated random bits are insufficiently random when at least one of the gap-frequency values falls repeatedly outside the predetermined acceptance range more than a predefined number of times.

5. The method of claim 1, further comprising
   generating a new set of random bits when at least one of the gap-frequency values falls repeatedly outside the predetermined acceptance range more than a predefined number of times.

6. The method of claim 1, further comprising
   denying the generated random bits for a subsequent application when at least one of the gap-frequency values falls repeatedly outside the predetermined acceptance range more than a predefined number of times.

7. A method for testing a stream of random numbers generated by a random-number generator, the method comprising:
   (a) segmenting the random binary bits into a predefined block of bits;
   (b) applying the segmented random bits to a gap-length calculation;
   (c) applying the output of the gap-length calculation to an exponential averaging counting to obtain and update a gap-frequency value between at least two identical blocks of bits;
   (d) comparing the gap-frequency value to a predetermined acceptance range; and,
   (e) determining whether at least one of the gap-frequency values falls outside the predetermined acceptance range more than a predefined number of times.

8. The method of claim 7, wherein the exponential averaging for each the predefined block of bits is updated according to the following equation:
$A_{new} = \alpha \cdot A_{old} + b$, wherein $\alpha$ falls between 0 and 1 ($0 < \alpha < 1$), and wherein b=1 if the least two identical block of bits occurs, otherwise b=0.

9. The method of claim 7, further comprising
determining that the generated random bits are insufficiently random when any of the gap-frequency values falls outside the predetermined acceptance range more than the predefined number of times.

10. The method of claim 7, further comprising:
if each gap-frequency value falls inside the predetermined acceptance range, repeating the steps (a)–(e) until at least one of the gap-frequency values falls outside the predetermined acceptance range.

11. The method of claim 10, further comprising
notifying that insufficiently random numbers are generated when the steps (a)–(e) are repeated more than the predefined number of times.

12. The method of claim 10, further comprising
generating a new set of random numbers when the steps (a)–(e) are repeated more than the predefined number of times.

13. A system for testing randomness, comprising:
a random-number generator for generating a random sequence comprising binary bits;
a detector for detecting whether the generated random sequence is sufficiently random based on an exponential-gap-frequency operation; and,
a switch for controlling the flow of the generated random sequences for a subsequent application based on the outcome of the exponential-gap-frequency operation, wherein:

the random sequence is segmented into a predefined block of bits to undergo the exponential-gap-frequency operation to obtain and update gap frequency values between at least two identical blocks of bits and,
if at least one of the gap-frequency values repeatedly falls outside a predetermined acceptance range more than a predefined number of times, determining that the generated random sequences are insufficiently random.

14. The system of claim 13, further comprising
a transmitter that is configured to transmit an alarm signal that the generated random sequences are insufficiently random when at least one of the gap-frequency values falls repeatedly outside the predetermined acceptance range more than the predefined number of times.

15. The system of claim 13, further comprising
a generator that is configured to generate a new set of random bits when at least one of the gap-frequency values falls repeatedly outside the predetermined acceptance range more than the predefined number of times.

16. A machine-readable medium having stored thereon data representing sequences of instructions, and the sequences of instructions which, when executed by a processor, cause the processor to:
generate a continuous stream of random binary bits;
segment the random binary bits into a predefined block of bits;
apply each the predefined block of bits to an exponential-gap-frequency calculation to compute and update gap-frequency values between at least two identical blocks of bits; and,
determine whether the generated random bits are sufficiently random by comparing the output of the exponential-gap-frequency calculation to a predetermined acceptance range.

17. The medium of claim 16, wherein
the generated random numbers are determined to be insufficiently random when at least one of the gap-frequency values falls outside the predetermined acceptance range.

18. The medium of claim 16, wherein
the processor is further operative to process a new set of random bits when at least one of the gap-frequency values falls outside the predetermined acceptance range.

19. The medium of claim 16, wherein
the processor is further operative to deny the generated random bits for a subsequent application when at least one of the gap-frequency values falls repeatedly outside the predetermined acceptance range more than a predefined number of times.

* * * * *